(12) United States Patent
Melack

(10) Patent No.: US 10,741,805 B1
(45) Date of Patent: Aug. 11, 2020

(54) BATTERY SUBMODULE ASSEMBLY FIXTURE WITH MULTIPLE ACTUATORS

(71) Applicant: Wisk Aero LLC, Mountain View, CA (US)

(72) Inventor: John Melack, Redwood City, CA (US)

(73) Assignee: WISK AERO LLC, Mountain View, CA (US)

( * ) Notice: Subject to any disclaimer, the term of this patent is extended or adjusted under 35 U.S.C. 154(b) by 0 days.

(21) Appl. No.: 16/426,353

(22) Filed: May 30, 2019

Related U.S. Application Data

(60) Provisional application No. 62/688,752, filed on Jun. 22, 2018.

(51) Int. Cl.
*H01M 2/10* (2006.01)
*H01M 2/02* (2006.01)

(52) U.S. Cl.
CPC ....... *H01M 2/1016* (2013.01); *H01M 2/0245* (2013.01)

(58) Field of Classification Search
CPC ..... H01M 2/10; H01M 2/1016; H01M 2/0245
See application file for complete search history.

(56) References Cited

U.S. PATENT DOCUMENTS

2018/0083306 A1* 3/2018 Melack ............... H01M 2/0285

* cited by examiner

*Primary Examiner* — Karie O'Neill Apicella
(74) *Attorney, Agent, or Firm* — Kilpatrick Townsend & Stockton LLP

(57) ABSTRACT

A first holder holds a plurality of layers associated with a battery submodule that is being assembled. A first and second pair of actuators, while the plurality of layers is held by the first holder, extend so that the first and second pair of actuators apply pressure to the plurality of layers. While the first and second pair of actuators are extended and applying pressure to the plurality of layers, the first holder retracts. A second holder holds a container associated with the battery submodule that is being assembled and extends so that the container gradually surrounds the plurality of layers. While the container gradually surrounds the plurality of layers, the first and second pair of actuators sequentially retract.

11 Claims, 6 Drawing Sheets

BATTERY SUBMODULE ASSEMBLY FIXTURE WITH MULTIPLE ACTUATORS

CROSS REFERENCE TO OTHER APPLICATIONS

This application claims priority to U.S. Provisional Patent Application No. 62/688,752 entitled BATTERY SUBMODULE ASSEMBLY FIXTURE WITH MULTIPLE ACTUATORS filed Jun. 22, 2018 which is incorporated herein by reference for all purposes.

BACKGROUND OF THE INVENTION

New types of battery submodules have been developed which include stacked (e.g., interleaved) layers of battery cells, insulation (e.g., thermal and/or electrical), and fins (e.g., for drawing out heat from the interior of the battery submodule). The cells in such battery submodules perform better when they are under slight pressure and therefore the assembly process produces a battery submodule where the can compresses its contents. New assembly devices which can more quickly and/or reliably assemble such battery submodules would be desirable.

BRIEF DESCRIPTION OF THE DRAWINGS

Various embodiments of the invention are disclosed in the following detailed description and the accompanying drawings.

DETAILED DESCRIPTION

Figure 1:
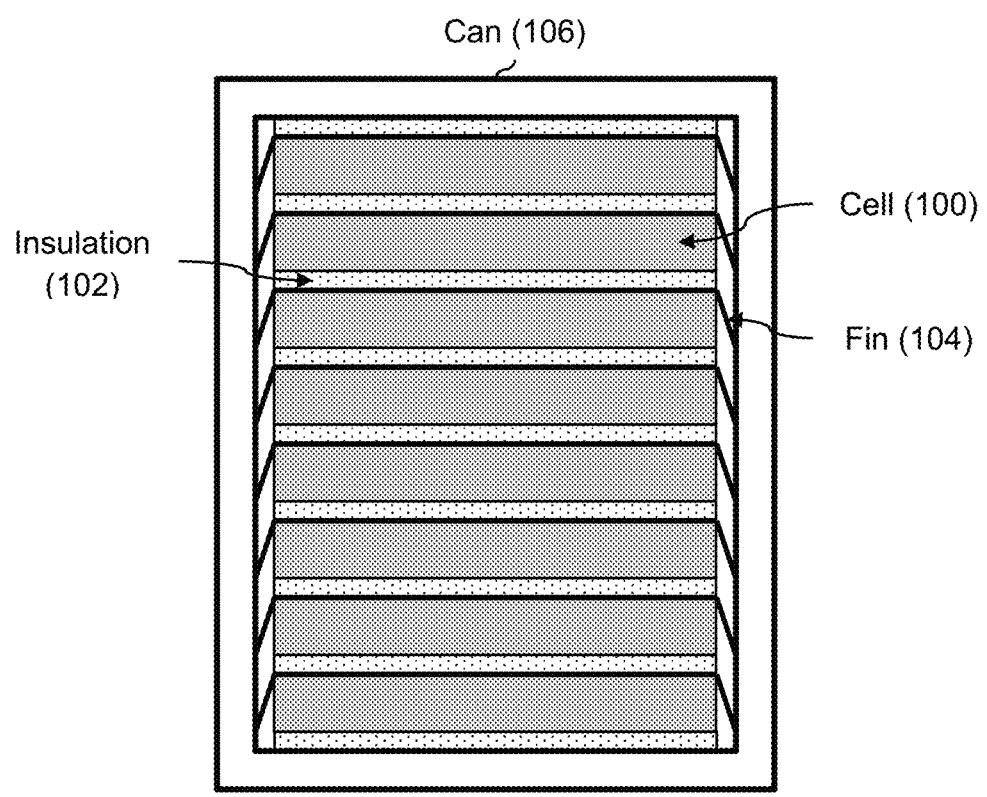
FIG. 1 is a diagram illustrating an embodiment of stacked layers in a can.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of an assembly device which assembles a battery submodule are described herein. As will be described in more detail below, this particular type of battery being assembled includes stacked layers of battery cells, insulation (e.g., thermal and/or electrical), and fins which are compressed by the can (or more generally, a case or container).

In some embodiments, the assembly device includes a first holder that is configured to hold a plurality of layers associated with a battery submodule that is being assembled. The assembly device may also include a first pair of actuators and a second pair of actuators that are configured to, while the plurality of layers is held by the first holder, extend so that the first pair of actuators and the second pair of actuators apply pressure to the plurality of layers, wherein: while the first pair of actuators and the second pair of actuators are extended and applying pressure to the plurality of layers, the first holder retracts. The assembly device may also include a second holder that is configured to hold a container associated with the battery submodule that is being assembled and extend so that the container gradually surrounds the plurality of layers, wherein: while the container gradually surrounds the plurality of layers, the first pair of actuators and the second pair of actuators sequentially retract (e.g., first one pair and then the other pair).

FIG. 1 is a diagram illustrating an embodiment of stacked layers in a can. In the example shown, a top view of the battery submodule without the lid on is shown. The can's contents include stacked layers of (battery) cells (100), insulation (102), and fins (104).

In this example, the cells are pouch cells. Pouch cells perform better when pressure is applied (e.g., ~1-20 PSI). More specifically, the cycle life of pouch cells can be extended by applying pressure to the pouch cells. For this reason, the stacked layers shown here are compressed by the can (106).

In this example, because the insulation (like all of the stacked layers) will be compressed, the insulation is made up of a material which can withstand (e.g., without collapsing) the expected pressure from the compressed can. For example, using the spring constant of a material as a metric of interest, the spring constant of the insulation should be non-negligible. In some embodiments, the insulation is made of aerogel which is a good thermal insulator and has a non-negligible spring constant.

Thermally, the layers of insulation prevent (or at least slow down and/or mitigate) heat from spreading from one cell to another cell. For example, suppose one cell fails catastrophically and in the process releases a large amount of heat. Without any insulation, all of that heat would propagate to a neighboring cell and cause that cell to also fail catastrophically. Eventually, all of the cells would fail catastrophically in a domino-like effect. This positive feedback cycle, domino-like effect (e.g., at the cell or battery level) is sometimes referred to as thermal runaway. The layers of insulation prevent (or at least slow down and/or mitigate) thermal runaway from happening (at least at the cell level).

The fins in this example are made of a thermally conductive material and act as a heat sink for the cell, removing the heat produced by the cell (e.g., during normal operation and/or a catastrophic failure) from the interior of the stacked layers to the exterior. Thermally, the fins are made of a material which is thermally conductive so that the fin can conduct heat away from the cell. Structurally, the fins act like a spring and push back when pressure is applied. This spring-like effect is useful because physical contact with the interior of the can is ensured even if there is some (e.g., air) gap around the fin. For example, if the edges of the layers are not aligned and/or the layers have different widths, then the fin may not be "squished" between the interior of the can and the side of the cell. The thermal conductor layer is better able to conduct heat when the fin is physically touching the can, so having the fin act like a spring ensures the fin always touches the can and has good thermal properties even if there is a gap around a bent portion of the fin. In some embodiments, the fins are made of metal (e.g., 1000 series Al) because metal is a good thermal conductor and permits the fin to act like a spring.

Figure 2:
FIG. 2 is a diagram illustrating a perspective view of an embodiment of an empty can.

FIG. 2 is a diagram illustrating a perspective view of an embodiment of an empty can. During the assembly process, the stacked layers shown in FIG. 1 are inserted into an empty can.

Figure 3:
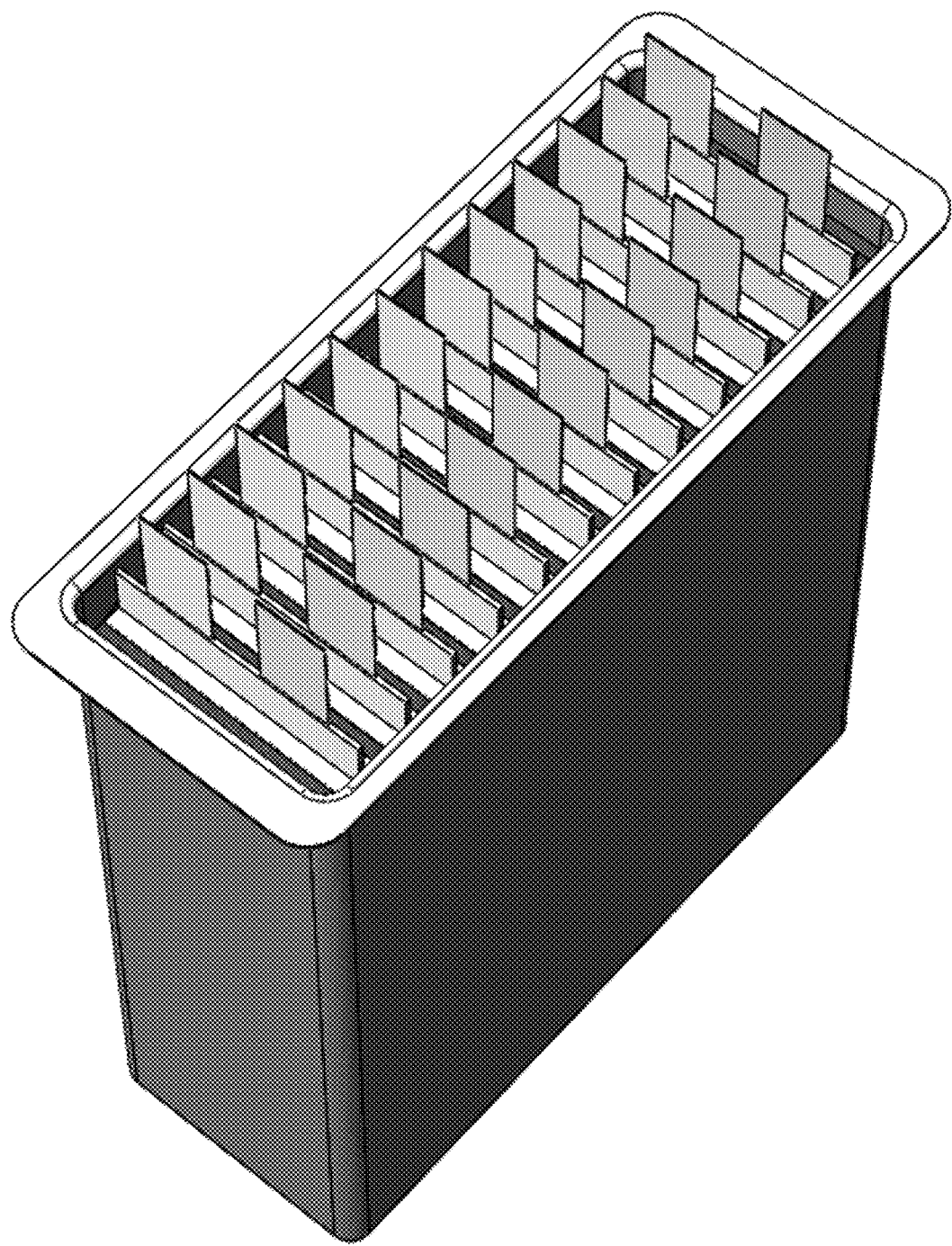
FIG. 3 is a diagram illustrating a perspective view of an embodiment of a can with the stacked layers inserted.

FIG. 3 is a diagram illustrating a perspective view of an embodiment of a can with the stacked layers inserted. For context, FIG. 3 shows an alternate view corresponding to the top view shown in FIG. 1. FIG. 3 shows a positive tab and negative tab (extending upwards) for each battery cell which are used to draw out the power generated by a particular battery cell; these tabs are not shown in FIG. 1 and are not relevant to the assembly device described herein.

One previous way to get the can to compress the contents is to use a can that is slightly larger than the stacked layers. After inserting the stacked layers into the empty can, the filled can is compressed. However, this assembly technique is undesirable because the displacement required to properly compress the insulation would break the can.

For this reason, a device to insert stacked layers into a (e.g., slightly smaller) can which will compress the inserted and stacked layers is desirable. The following figures describe some embodiments of such a device.

Figure 4A:
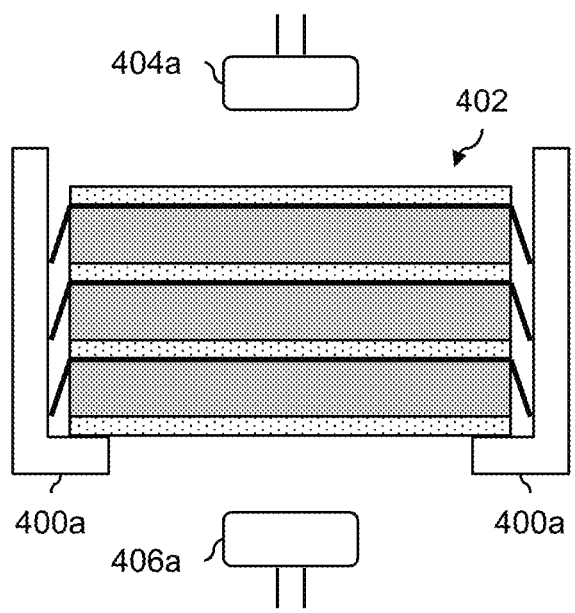
FIG. 4A is a diagram illustrating an embodiment of a holder for holding stacked layers before a plurality of upper actuators and lower actuators compress the stacked layers.

FIG. 4A is a diagram illustrating an embodiment of a holder for holding stacked layers before a plurality of upper actuators and lower actuators compress the stacked layers. In the example shown, a holder (400a) comprising two L-shaped parts is used to hold the stacked layers (402). For example, a worker may insert each layer into the holder in the appropriate order. The L-shaped parts offer a ledge on which the layers can rest.

Once all of the layers have been inserted into the holder in the appropriate order, a plurality of upper actuators (404a) and lower actuators (406a) are extended downward and upward, respectively, so that the stacked layers are compressed and held between the two sets of actuators. Once compressed, the height of the stacked layers is shorter than the height of the can so that the compressed layers are able to fit inside the can. In various embodiments, the actuators may include linear actuators and/or pneumatic actuators.

The following figure shows the system after the actuators have extended to compress the stacked layers.

Figure 4B:
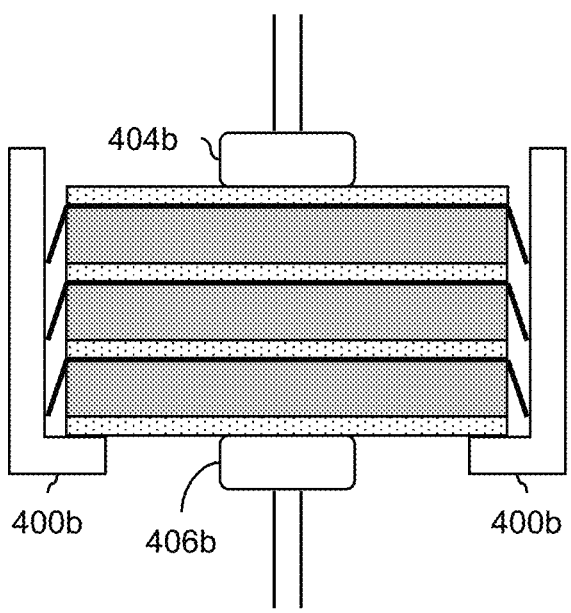
FIG. 4B is a diagram illustrating an embodiment of a plurality of upper actuators and lower actuators compressing stacked layers.

FIG. 4B is a diagram illustrating an embodiment of a plurality of upper actuators and lower actuators compressing stacked layers. In the state shown here, the actuators (404b and 406b) are holding the stacked layers between them. In one example, the pressure applied by each actuator is on the order of 5-150 PSIG.

With the upper actuators and lower actuators holding the stacked layers in place, the holder can be removed. The L-shaped parts (400b) are therefore moved away from the stacked layers. The following figure shows an example of this.

Figure 4C:
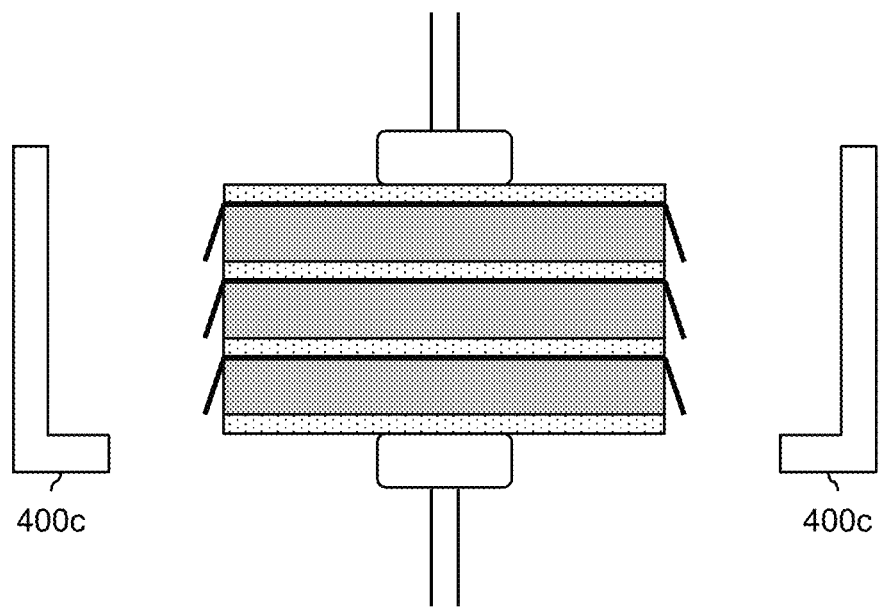
FIG. 4C is a diagram illustrating an embodiment of a plurality of upper actuators and lower actuators compressing stacked layers, without the holder supporting the stacked layers.

FIG. 4C is a diagram illustrating an embodiment of a plurality of upper actuators and lower actuators compressing stacked layers, without the holder supporting the stacked layers. As shown in this figure, the L-shaped parts (400c) comprising the holder have been pulled away from the stacked layers, such that the stacked layers are supported only by the actuators.

The holders (400a-400c) shown in FIGS. 4A-4C show one embodiment of a (first) holder that is configured to hold a plurality of layers. As shown in this example, the first holder may include a first L-shaped part and a second L-shaped part (e.g., on the left and on the right) and retracting the first holder may include the first L-shaped part and the second L-shaped part moving away from each other (e.g., the one on the left to the left and the one on the right to the right) and away from the plurality of layers.

Naturally, some other embodiments are possible. For example, in some embodiments, the stacked layers are held in a holder comprising a single piece or part. For example, the two L-shaped parts may be joined by a (complete) back surface and at least partially on a bottom surface (e.g., with a cutout and/or access on the bottom for the bottom actuators to make contact with the bottommost layer). The holder may move forward or backwards to release the stacked layers while the can is pushed around the stacked layers from the opposite direction.

Next, the compressed layers are inserted into the can. The following figures show an example of this.

Figure 5A:
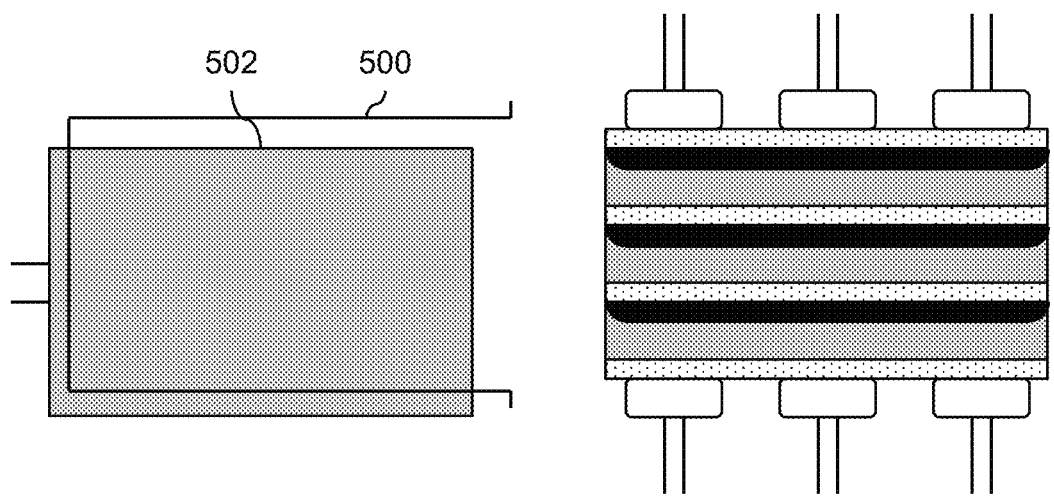
FIG. 5A is a diagram illustrating an embodiment of a can which is pushed towards stacked layers which are held in place by a plurality of upper actuators and lower actuators.

FIG. 5A is a diagram illustrating an embodiment of a can which is pushed towards stacked layers which are held in place by a plurality of upper actuators and lower actuators. In this example a side view is shown to better show the components being discussed. To improve the visibility of the figure, the L-shaped parts comprising the holder (shown in FIG. 4A-FIG. 4C) are not shown here.

In the example shown here, an empty can (500) sits in a can holder (502). Can holder 502 is one example of a (second) holder that is configured to hold a container and extend so that the container gradually surrounds the plurality of layers. For example, the can holder may be U-shaped, with no surface at the top and the side facing the stacked layers. The can holder is connected to an actuator which pushes or otherwise extends the empty can towards the stacked layers held in place by the upper and lower actuators.

Figure 5B:
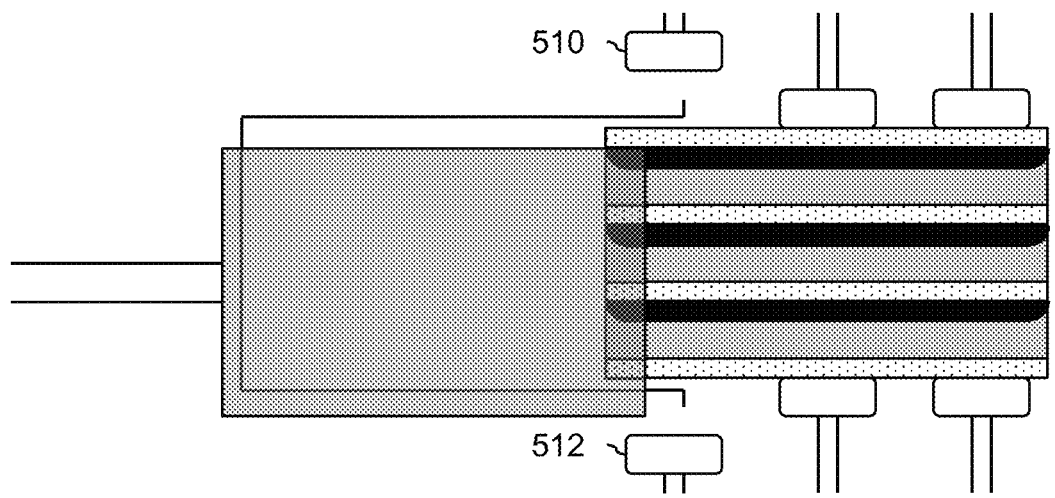
FIG. 5B is a diagram illustrating an embodiment where a first pair of actuators is retracted so that the can is able to fit around the bottom portion of the stacked layers.

FIG. 5B is a diagram illustrating an embodiment where a first pair of actuators is retracted so that the can is able to fit around the bottom portion of the stacked layers. In the state shown here, the upper actuator (510) and lower actuator (512) that are closest to the can have retracted, giving the can and can holder sufficient space to fit around the stacked layers. The other actuators are still applying pressure to the stacked layers, so that the stacked layers are still compressed and are still held in place, aligned with the can's opening.

One potential problem during assembly is that the edges of the fins (which stick out slightly from the rest of the stacked layers) could become caught on the lip of the can as the can is pushed around the compressed and stacked layers. In some embodiments, this potential problem is solved by improving the positional accuracy of the can's position relative to the stacked layers so that the stacked layers are better aligned with respect to the can's opening. In some embodiments, this potential problem is solved by enlarging the can at its opening. For example, at the very top of the can where the vertical can wall meets the horizontal can flange or lip, the can may be widened relative to lower cross sections to help funnel or guide the fins and other stacked layers into the can. Once the stacked layers are fully inserted, the fins will typically sit below this band or radius so increasing this dimension will not noticeably affect fin-to-can wall contact and thus will not noticeably affect the battery submodule's ability to dissipate heat.

The actuator attached to the can holder continues to extend and the following figure shows the assembly device after the next pair of actuators have retracted.

Figure 5C:
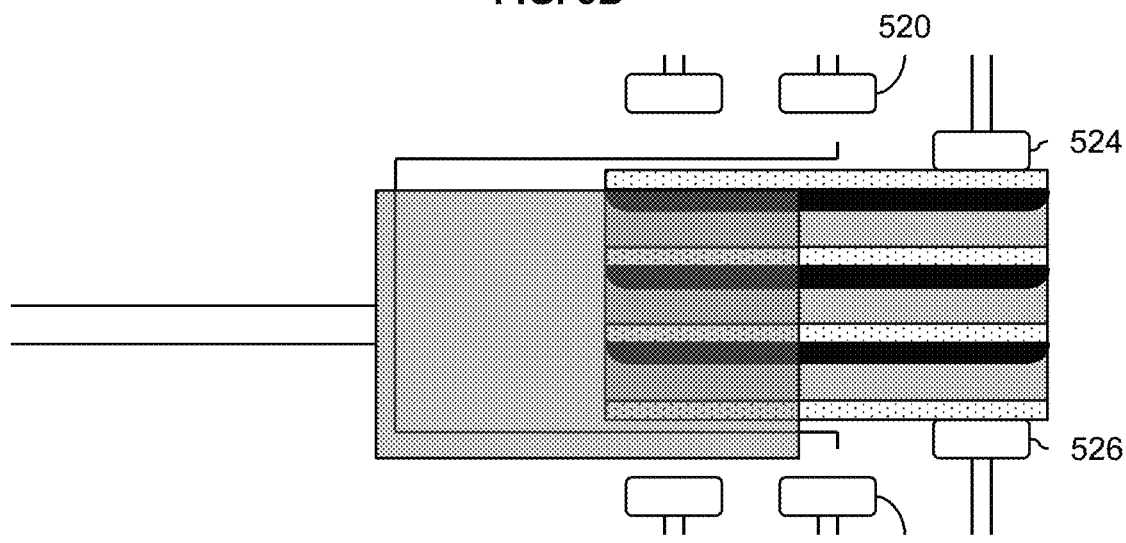
FIG. 5C is a diagram illustrating an embodiment where a second pair of actuators has retracted.

FIG. 5C is a diagram illustrating an embodiment where a second pair of actuators has retracted. In this state, the can has continued to envelope the stacked layers and the second pair of actuators (520 and 522) have retracted to permit the can to continue its progress. The third pair of actuators (524 and 526) is still extended and are the only actuators holding the stacked layers in place in the state shown here.

This process continues until all of the upper and lower actuators have retracted and the layers are entirely in the can. Since the dimensions of the can are slightly smaller than the uncompressed height of the stacked layers, the can will apply pressure on its contents (i.e., the stacked layers inside of the can).

The actuators shown in FIGS. 5A-5C show an example of a first pair of actuators and a second pair of actuators that are configured to (while the plurality of layers is held by the first holder) extend so that the first pair of actuators and the second pair of actuators apply pressure to the plurality of layers and (while a container gradually surrounds the plurality of layers) sequentially retract (e.g., first the pair that is closest to the container (e.g., the pair which includes actuators 510 and 512 in FIG. 5B), then the pair that is the next closest to the container (e.g., the pair which includes actuators 520 and 522 in FIG. 5C), and so on). This example also shows that in various embodiments a pair of actuators may include a top actuator (see, e.g., actuator 510 in FIG. 5B) and a bottom actuator (see, e.g., actuator 512 in FIG. 5B), may extend and retract along a vertical axis, and/or that top (bottom) actuators are configured to extend and come into contact with a topmost (bottommost) layer in the plurality of layers.

In some embodiments, the ends of the actuators holding the stacked layers in place and retracting in sequential order are made of some compliant (e.g., flexible) and "grippy" material such as rubber. These properties may be desirable because it holds the stacked layers in place, even as the stacked layers try to slip free as the can envelopes (and pushes against) the stacked layers.

In some of the examples shown here, the ends of the actuators are cylindrically shaped. This is merely exemplary and is not intended to be limiting. For example, in some embodiments, the ends of the actuators are rectangular and have substantially the same width as the stacked layers (see, e.g., the view shown in FIGS. 4A-4C). Having contact with the stacked layers which extends across most of the width of the stacked layers may offer a better grip so that the layers do not slip out as the can is squeezed around the layers.

In some embodiments, to (further) prevent some of the stacked layers from slipping during the insertion process, two or more adjacent layers are taped together. For example, the fins and cells may be smoother and/or slipperier than the insulation (e.g., which may have a rougher surface and therefore have more friction). For this reason, in some embodiments, adjacent fins and cells are taped together (e.g., on the side facing the can).

In some embodiments, the actuator which pushes the can forward must move relatively slowly or else the can will jam against the actuators holding the stacked layers in place. In some embodiments, the can may be moved on the order of 0-100 inches/minute.

In some embodiments, the tip of the last pair of actuators holding the stacked layers in place has a larger surface area (that comes into contact with the topmost or bottommost stacked layer) than the tips of the other pairs of actuators. For example, since the last pair of actuators will hold the entire stack by itself while the can is pushing against the stacked layers, using a (strictly) larger tip (e.g., with more surface area touching the stacked layers) at the end of the actuators may help to more securely hold the stacked layers. In one example, the tip of the last actuator is rectangular (e.g., from the point of view shown in FIGS. 4A-4C, wider than it is deeper) and the other tips are cylindrical.

In some embodiments, the linear actuators and/or pneumatics are sealed. For example, the insulation in the stacked layers may comprise aerogel which produces aerogel dust during the assembly process and which may bind to the linear actuators and/or pneumatics (which is undesirable).

Figure 6:
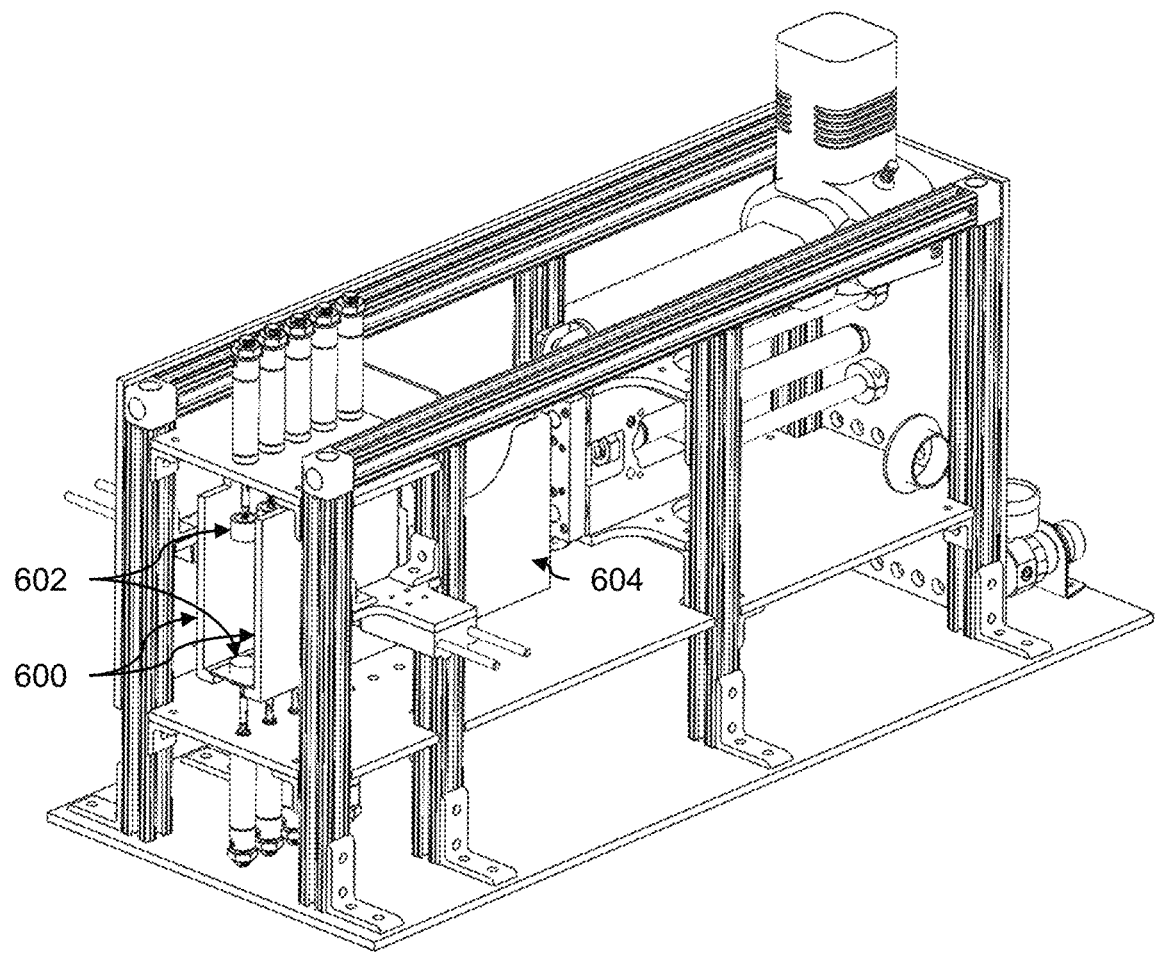
FIG. 6 is a diagram illustrating an embodiment of a complete assembly device.

FIG. 6 is a diagram illustrating an embodiment of a complete assembly device. In this example, L-shaped holder 600 initially holds the stacked layers, upper and lower actuators 602 subsequently extend to hold the stacked layers in place, and then can holder 604 (which holds the can) pushes the can forward to surround the stacked layers as the upper and lower actuators retract, one upper-lower pair at a time.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a first holder that is configured to hold a plurality of layers associated with a battery submodule that is being assembled, wherein the first holder includes a first L-shaped part and a second L-shaped part separated from each other at least by a width of the plurality of layers, wherein an elongated portion of the first L-shaped part or the second L-shaped part extend along a side of the plurality of layers, wherein a short portion of the first L-shaped part or the second L-shaped part is provided at a bottom surface of the plurality of layers, wherein only a portion of the bottom surface of the plurality of layers rest on the short portion;

a first pair of actuators and a second pair of actuators that are configured to, while the plurality of layers is held by the first holder, extend so that the first pair of actuators and the second pair of actuators apply pressure to the plurality of layers, wherein: while the first pair of actuators and the second pair of actuators are extended and applying pressure to the plurality of layers, the first holder retracts by moving the first L-shaped part and the second L-shaped part away from each other and away from the plurality of layers; and a second holder that is configured to hold a container associated with the battery submodule that is being assembled and extend so that the container gradually surrounds the plurality of layers, wherein: while the container gradually surrounds the plurality of layers, the first pair of actuators and the second pair of actuators sequentially retract.

2. The system recited in claim 1, wherein:
the first pair of actuators includes a first top actuator and a first bottom actuator;
the second pair of actuators includes a second top actuator and a second bottom actuator; and
the first pair of actuators and the second pair of actuators are configured to extend and retract along a vertical axis.

3. The system recited in claim 1, wherein:
the first pair of actuators includes a first top actuator and a first bottom actuator;
the second pair of actuators includes a second top actuator and a second bottom actuator;
the first top actuator and the second top actuator are configured to extend and come into contact with a topmost layer in the plurality of layers; and
the first bottom actuator and the second bottom actuator are configured to extend and come into contact with a bottommost layer in the plurality of layers.

4. The system recited in claim 1, wherein a last pair of actuators that is last to sequentially retract has tips with a strictly larger surface area compared to other pairs of actuators.

5. A method, comprising:
using a first holder to hold a plurality of layers associated with a battery submodule that is being assembled, wherein the first holder includes a first L-shaped part and a second L-shaped part separated from each other at least by a width of the plurality of layers;
using a first pair of actuators and a second pair of actuators to, while the plurality of layers is held by the first holder, extend so that the first pair of actuators and the second pair of actuators apply pressure to the plurality of layers, retracting the first holder while the first pair of actuators and the second pair of actuators are extended and applying pressure to the plurality of layers, retracting includes:
moving the first L-shaped part and the second L-shaped part away from each other and away from the plurality of layers;
using a second holder to hold a container associated with the battery submodule that is being assembled and extend so that the container gradually surrounds the plurality of layers
sequentially retracting the first pair of actuators and the second pair of actuators while the container gradually surrounds the plurality of layers.

6. The method recited in claim 5, wherein:
the first pair of actuators includes a first top actuator and a first bottom actuator;
the second pair of actuators includes a second top actuator and a second bottom actuator; and
the first pair of actuators and the second pair of actuators are configured to extend and retract along a vertical axis.

7. The method recited in claim 5, wherein:
the first pair of actuators includes a first top actuator and a first bottom actuator;
the second pair of actuators includes a second top actuator and a second bottom actuator;
the first top actuator and the second top actuator are configured to extend and come into contact with a topmost layer in the plurality of layers; and
the first bottom actuator and the second bottom actuator are configured to extend and come into contact with a bottommost layer in the plurality of layers.

8. The method recited in claim 5, wherein a last pair of actuators that is last to sequentially retract has tips with a strictly larger surface area compared to other pairs of actuators.

9. The system recited in claim 1, wherein the first pair of actuators and the second pair of actuators directly contact a top surface and the bottom surface of the plurality of layers to apply pressure to the plurality of layers.

10. The method recited in claim 5, wherein the first pair of actuators and the second pair of actuators directly contact a top surface and a bottom surface of the plurality of layers to apply pressure to the plurality of layers.

11. The method recited in claim 5, wherein an elongated portion of the first L-shaped part or the second L-shaped part extend along a side of the plurality of layers, wherein a short portion of the first L-shaped part or the second L-shaped part is provided at a bottom surface of the plurality of layers, wherein only a portion of the bottom surface of the plurality of layers rest on the short portion.

* * * * *